(12) United States Patent
Ito et al.

(10) Patent No.: US 12,442,062 B2
(45) Date of Patent: Oct. 14, 2025

(54) HOT-ROLLED STEEL SHEET

(71) Applicant: NIPPON STEEL CORPORATION, Tokyo (JP)

(72) Inventors: Daisuke Ito, Tokyo (JP); Akifumi Sakakibara, Tokyo (JP); Teruki Hayashida, Tokyo (JP); Tatsuo Yokoi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 398 days.

(21) Appl. No.: 18/027,800

(22) PCT Filed: Jan. 7, 2022

(86) PCT No.: PCT/JP2022/000308
§ 371 (c)(1),
(2) Date: Mar. 22, 2023

(87) PCT Pub. No.: WO2022/153927
PCT Pub. Date: Jul. 21, 2022

(65) Prior Publication Data
US 2023/0357908 A1    Nov. 9, 2023

(30) Foreign Application Priority Data
Jan. 15, 2021    (JP) ................. 2021-005008

(51) Int. Cl.
| | | |
|---|---|---|
| C22C 38/58 | (2006.01) |
| C21D 1/18 | (2006.01) |
| C21D 6/00 | (2006.01) |
| C21D 8/02 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C22C 38/28 | (2006.01) |
| C22C 38/32 | (2006.01) |
| C22C 38/42 | (2006.01) |
| C22C 38/50 | (2006.01) |
| C22C 38/54 | (2006.01) |

(52) U.S. Cl.
CPC ............... *C22C 38/58* (2013.01); *C21D 1/18* (2013.01); *C21D 6/002* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/28* (2013.01); *C22C 38/32* (2013.01); *C22C 38/42* (2013.01); *C22C 38/50* (2013.01); *C22C 38/54* (2013.01); *C21D 2211/008* (2013.01)

(58) Field of Classification Search
CPC .................... C22C 38/58; C21D 2211/008
See application file for complete search history.

(56) References Cited

FOREIGN PATENT DOCUMENTS

| | | |
|---|---|---|
| EP | 3 730 647 A1 | 10/2020 |
| JP | 2016-211073 A | 12/2016 |
| JP | 2018-188675 A | 11/2018 |

*Primary Examiner* — Alexandra M Moore
(74) *Attorney, Agent, or Firm* — Birch, Stewart, Kolasch & Birch, LLP

(57) ABSTRACT

In a hot-rolled steel sheet, a microstructure contains, in area ratio, at a location at ¼ a sheet thickness, a total amount of 90% or more of one or more of martensite and tempered martensite and a total amount of 10% or less of one or more of ferrite, bainite, and pearlite, at a location of 200 μm from the surface, a total amount of 70% or more and less than 90% of one or more of martensite and tempered martensite and a total amount of more than 10% and 30% or less of one or more of ferrite, bainite, and pearlite.

9 Claims, No Drawings

HOT-ROLLED STEEL SHEET

TECHNICAL FIELD

The present invention relates to a hot-rolled steel sheet.

Priority is claimed on Japanese Patent Application No. 2021-005008, filed Jan. 15, 2021, the content of which is incorporated herein by reference.

BACKGROUND ART

In recent years, the strength of steel sheets has been increasing to ensure the collision safety of automobiles and reduce the environmental load. In order to increase the strength of steel sheets, making microstructures have a martensite single phase is effective. Since steel sheets in which microstructures have a martensite single phase have poor ductility compared to composite structure steel sheets such as dual phase (DP) steel sheets and transformation induced plasticity (TRIP) steel sheets, the steel sheets may be processed to have desired shapes mainly through bending in many cases. For this reason, steel sheets having a martensite single phase are required to have excellent bendability.

Patent Document 1 discloses a high-strength hot-rolled steel sheet which has a martensite phase or tempered martensite phase as a main phase. has a structure in which a volume ratio of the main phase with respect to the entire structure is 90% or more, an average grain size of prior austenite grains is 20 μm or less in a cross section parallel to a rolling direction and 15 μm or less in a cross section perpendicular to the rolling direction, and an aspect ratio of the prior austenite grains in the cross section parallel to the rolling direction is 18 or less, and has excellent low temperature toughness.

Patent Document 2 discloses a high-strength hot-rolled steel sheet in which a steel structure is composed of at least one of a martensite phase and a tempered martensite phase, which has a main phase in which an area ratio with respect to the entire steel structure is 95% or more, which contains cementite with an average grain size of 0.5 μm or less in a lath of the martensite phase and/or the tempered martensite phase, and in which the content of cementite is, in % by mass, 0.01 to 0.08%.

However, the inventors of the present invention have found that the steel sheets described in Patent Documents 1 and 2 do not provide sufficient bendability.

CITATION LIST

Patent Document

[Patent Document 1]
Japanese Unexamined Patent Application, First Publication No. 2016-211073
[Patent Document 2]
Japanese Unexamined Patent Application, First Publication No. 2018-188675

SUMMARY OF THE INVENTION

Problems to be Solved by the Invention

An object of the present invention which has been made in view of the above circumstances is to provide a hot-rolled steel sheet having high strength and excellent bendability.

Means for Solving the Problem

The inventors of the present invention obtained the following findings as results of creative research and conceived the present invention.

It was found that a hot-rolled steel sheet having high strength and excellent bendability can be obtained by setting a total area ratio of martensite and tempered martensite to 90% or more in a microstructure at a location at ¼ a sheet thickness from the surface and setting a total area ratio of martensite and tempered martensite to 70% or more and less than 90% in a microstructure at a location of 200 μm from the surface.

Also, the inventors of the present invention have found that controlling finish rolling conditions and cooling conditions after finish rolling are particularly effective when obtaining the hot-rolled steel sheet.

The gist of the present invention made on the basis of the above findings is as follows.

(1) A hot-rolled steel sheet according to an aspect of the present invention has a chemical composition which contains, in % by mass, C: 0.050 to 0.150%,
Si: 0.01 to 1.00%,
Mn: 1.00 to 2.50%,
P: 0.100% or less.
S: 0.020% or less,
N: 0.0050% or less,
Al: 0.001 to 0.300%,
Ti: 0.001 to 0.100%,
B: 0.0005 to 0.0050%,
Nb: 0 to 0.100%,
Cr: 0 to 1.00%,
V: 0 to 0.30%,
Cu: 0 to 0.30%,
Ni: 0 to 0.30%, and
Ca: 0 to 0.0050%, wherein the remainder is composed of Fe and impurities, Vc is represented by the following Expressions (1) to (3) is 10 to 40, a microstructure contains, in area ratio, at a location at ¼ a sheet thickness, a total amount of 90% or more of one or more of martensite and tempered martensite and a total amount of 10% or less of one or more ferrite, bainite, and pearlite, at a location of 200 μm from a surface, a total amount of 70% or more and less than 90% of one or more of martensite and tempered martensite and a total amount of more than 10% and 30% or less of one of more of ferrite, bainite, and pearlite:

when an effective amount of B≥0.0005% by mass is satisfied, $$V_C = 10^{2.94 - 0.75 \times (2.7 \times C + 0.4 \times Si + Mn + 0.45 \times Ni + 0.8 \times Cr)}$$

when an effective amount of B≤0.0005% by mass is satisfied, $$V_C = 10^{3.69 - 0.7 \times (2.7 \times C + 0.4 \times Si + Mn + 0.45 \times Ni + 0.8 \times Cr)} \tag{1}$$

$$\text{an effective amount of B} = 10.81 \times (B/10.81 - \text{solid solution N amount}/14.01) \tag{2}$$

and $$\text{solid solution N amount} = 14.01 \times (N/14.01 - Ti/47.88) \tag{3}$$

here, each element symbol in the above Expression (1) is the content of the element in % by mass, and when the element is not contained, 0 is substituted, B in the above Expression (2) is, in % by mass, a B content,
when the effective amount of B is a negative value, the effective amount of B is set to 0,
N and Ti in the above Expression (3) are, in % by mass, contents, and
when the solid solution N amount is a negative value, the solid solution N amount is 0.

(2) The hot-rolled steel sheet according to the above (1) may have the chemical composition which contains, in % by mass,
one or two or more of the group including
Nb: 0.005 to 0.100%,
Cr: 0.005 to 1.00%,
V: 0.005 to 0.30%,
Cu: 0.005 to 0.30%.
Ni: 0.005 to 0.30%, and
Ca: 0.0010 to 0.0050%.

(3) In the hot-rolled steel sheet according to the above (1) or (2), the microstructure may have, at the location at ¼ a sheet thickness, an average aspect ratio of prior austenite grains of 1.0 to 3.0.

(4) In the hot-rolled steel sheet according to any one of the above (1) to (3), the microstructure may have, at the location at ¼ a sheet thickness, an average grain size of prior austenite grains of 5 to 40 μm.

Effects of the Invention

According to the aspect associated with the present invention, it is possible to provide a hot-rolled steel sheet having high strength and excellent bendability.

EMBODIMENT(S) FOR IMPLEMENTING THE INVENTION

A hot-rolled steel sheet according to an embodiment will be described in detail below. Here, the present invention is not limited only to the constitution disclosed in the embodiment and various modifications are possible without departing from the gist of the present invention.

In a numerical limitation range which will be described below having numerical values having the term "to" written therebetween, a lower limit value and a higher limit value are included in the range. Numerical values written with the terms "less than" and "more than" are not included in the numerical value range. All "%" in chemical compositions refer to "% by mass."

In a hot-rolled steel sheet according to an embodiment, a chemical composition contains, in % by mass, C: 0.050 to 0.150%, Si: 0.01 to 1.00%, Mn: 1.00 to 2.50%, P: 0.100% or less, S: 0.020% or less, N: 0.0050% or less, Al: 0.001 to 0.300%, Ti: 0.001 to 0.100%, B: 0.0005 to 0.0050%, and the remainder: Fe and impurities. Each element will be described below.

C: 0.050 to 0.150%

C enhances a strength of a hot-rolled steel sheet. If the C content is less 0.050%, a desired strength cannot be obtained. For this reason, the C content is set to 0.050% or more. The C content is preferably 0.070% or more.

On the other hand, if the C content is more than 0.150%, the weldability and the toughness of the hot-rolled steel sheet deteriorate. For this reason, the C content is set to 0.150% or less. The C content is preferably 0.130% or less or 0.110% or less.

Si: 0.01 to 1.00%

Si enhances a strength of a hot-rolled steel sheet through solid-solution strengthening and improved hardenability. Furthermore, Si also has a deoxidizing effect. If the Si content is less than 0.01%, the above effect due to the action cannot be obtained. For this reason, the Si content is set to 0.01% or more.

On the other hand, if the Si content is more than 1.00%, ferrite transformation is accelerated and a desired microstructure cannot be obtained. For this reason, the Si content is set to 1.00% or less. The Si content is preferably 0.40% or less or 0.30% or less.

Mn: 1.00 to 2.50%

Mn enhances a strength of a hot-rolled steel sheet through solid-solution strengthening and improved hardenability. If the Mn content is less than 1.00%, the above effect cannot be obtained. For this reason, the Mn content is set to 1.00% or more. The Mn content is preferably 1.50% or more or 1.80% or more.

On the other hand, the above effect is saturated even if the Mn content is more than 2.50%. For this reason, the Mn content is set to 2.50% or less. The Mn content is preferably 2.30% or less or 2.20% or less.

P: 0.100% or less

P reduces the bendability of the hot-rolled steel sheet. For this reason, the P content is set to 0.100% or less. The P content is preferably 0.020% or less.

Since the lower the P content, the more preferable, the P content is preferably 0%. However, since excessive P reduction increases the cost of removing P, the P content may be 0.001% or more.

S: 0.020% or less

S reduces the bendability of hot-rolled steel sheets. For this reason, the S content is set to 0.020% or less. The S content is preferably 0.010% or less.

Since the lower the S content, the better, it is preferably 0%. However, since excessive reduction in amount of S increases costs, the S content may be 0.001% or more.

N: 0.0050% or Less

N lowers the workability of hot-rolled steel sheets. For this reason, the N content is set to 0.0050% or less. The N content is preferably 0.0040% or less.

Since the lower the N content, the better, it is preferably 0%. However, since excessive reduction in amount of N increases costs, the N content may be 0.0010% or more.

Al: 0.001 to 0.300%

Al has the effect of cleaning steel through deoxidizing (preventing the occurrence of defects such as blowholes in steel). This effect cannot be obtained if the Al content is less than 0.001%. For this reason, the Al content is set to 0.001% or more. The Al content is preferably 0.003% or more or 0.010% or more.

On the other hand, the above effect is saturated even if the Al content is more than 0.300%. Furthermore, a desired microstructure cannot be obtained by accelerating ferrite transformation. For this reason, the Al content is set to 0.300% or less. The Al content is preferably 0.100% or less or 0.050% or less.

Ti: 0.001 to 0.100%

Ti enhances the strength of hot-rolled steel sheets by finely precipitating Ti as a carbide thereof in steel sheets. Furthermore, Ti forms a nitride to fix N and prevent coarsening of austenite grains. If the Ti content is less than 0.001%, the above effect cannot be obtained. In addition, the preferable control of the microstructure at a location of 200 μm from the surface cannot be performed. Desired bendability cannot be obtained. For this reason, the Ti content is set to 0.001% or more. The Ti content is preferably 0.005% or more or 0.010% or more.

On the other hand, if the Ti content is more than 0.100%, a large amount of coarse carbide and nitride precipitates in the steel and the workability of the hot-rolled steel sheet deteriorates. For this reason, the Ti content is set to 0.100% or less. The Ti content is preferably 0.050% or less or 0.030% or less.

B: 0.0005 to 0.0050%

B increases the strength of hot-rolled steel sheets by significantly improving hardenability even with a small content of B through B segregated in the austenite grain boundaries. If the B content is less than 0.0005%, the above effect cannot be obtained. For this reason, the B content is set to 0.0005% or more. The B content is preferably 0.0010% or more or 0.0013% or more.

On the other hand, if the B content is more than 0.0050%, recrystallization of austenite during hot rolling is minimized, the rolling load increases, and a desired microstructure cannot be obtained. For this reason, the B content is set to 0.0050% or less. The B content is preferably 0.0040% or less or 0.0030% or less.

The remainder of the chemical composition of the hot-rolled steel sheet according to the embodiment may be Fe and impurities. In the embodiment, the impurities mean ores as raw materials, scrap, or materials mixed in from the manufacturing environment, or materials which are allowed within the range which does not adversely affect the hot-rolled steel sheet according to the embodiment.

The hot-rolled steel sheet according to the embodiment may contain the following arbitrary elements instead of a part of Fe. Lower limits of the contents when the arbitrary elements are not contained are 0%. Each of the arbitrary elements will be described below.

Nb: 0.005 to 0.100%

Nb precipitates in steel as carbide or nitride, increasing the strength of hot-rolled steel sheets. Also, these precipitates minimize the coarsening of austenite grains and accelerate the refinement of the microstructure. In order to reliably obtain these effects, the Nb content is preferably 0.005% or more.

On the other hand, if the Nb content is more than 0.100%, a large amount of coarse carbide and nitride precipitate in the steel and the workability of the hot-rolled steel sheet decreases. For this reason, the Nb content is set to 0.100% or less. Preferably, the Nb content is 0.030% or less.

Cr: 0.005 to 1.00%

Cr improves hardenability and increases the strength of hot rolled steel sheets. In order to reliably obtain this effect, the Cr content is preferably 0.005% or more.

On the other hand, if the Cr content is more than 1.00%, the weldability of the hot-rolled steel sheet decreases. For this reason, the Cr content is set to 1.00% or less. The Cr content is preferably 0.30% or less.

V: 0.005 to 0.30%

V contributes to increasing the strength of hot-rolled steel sheets by forming a solid solution in steel, precipitates in steel sheets as carbide, nitride, or carbonitride, and contributes to increasing the strength of hot-rolled steel sheets even through precipitation strengthening. In order to reliably obtain these effects, the V content is preferably 0.005% or more.

On the other hand, if the V content is more than 0.30%, the toughness of the hot-rolled steel sheet decreases. For this reason, the V content is set to 0.30% or less. The V content is preferably 0.10% or less.

Cu: 0.005 to 0.30%

Cu forms a solid solution in steel, contributes to increasing the strength of hot-rolled steel sheets, and also contributes to improving corrosion resistance. In order to reliably obtain these effects, the Cu content is preferably 0.005% or more.

On the other hand, if the Cu content is more than 0.30%, the surface properties of the hot-rolled steel sheet deteriorate. For this reason, the Cu content is set to 0.30% or less. The Cu content is preferably 0.10% or less.

Ni: 0.005 to 0.30%

Ni forms a solid solution in steel, contributes to increasing the strength of the hot-rolled steel sheet, and contributes to improving toughness. In order to reliably obtain these effects, the Ni content is preferably 0.005% or more.

Ni is an expensive element, and if the Ni content is more than 0.30%, it causes an increase in alloy cost. For this reason, the Ni content is set to 0.30% or less. The Ni content is preferably 0.10% or less.

Ca: 0.0010 to 0.0050%

Ca refines oxides and nitrides which precipitate during solidification and improves the cleanliness of a steel ingot and a billet. In order to reliably obtain this effect, the Ca content is preferably 0.0010% or more.

On the other hand, even if more than 0.0050% of Ca is contained, the above effect is saturated, causing an increase in cost. For this reason, the Ca content is set to 0.0050% or less. The Ca content is preferably 0.0030% or less.

The chemical composition of the hot-rolled steel sheet may be measured through general analytical methods. For example, the chemical composition may be measured using inductively coupled plasma-atomic emission spectrometry (ICP-AES) or emission spectroscopic analysis (optical emission spectroscopy: OES). C and S may be measured using a combustion-infrared absorption method and N may be measured using an inert gas fusion-thermal conductivity method.

The chemical composition of the hot-rolled steel sheet according to the embodiment has Vc of 10 to 40 represented by the following Expressions (1) to (3). If Vc is less than 10 or more than 40, the microstructure cannot be favorably controlled at a location at ¼ the sheet thickness and/or a location of 200 μm from the surface.

An effective amount of B in the following Expression (1) corresponds to an amount of B which contributes to hardenability and can be obtained through the following Expression (2). Furthermore, a solid solution N amount in the following Expression (2) can be obtained through the following Expression (3).

When an effective amount of B≥0.0005% by mass is satisfied.

$$V_C = 10^{2.94 - 0.75 \times (2.7 \times C + 0.4 \times Si + Mn + 0.45 \times Ni + 0.8 \times Cr)}$$

when an effective amount of B≤0.0005% by mass is satisfied, $$V_C = 10^{3.69 - 0.7 \times (2.7 \times C + 0.4 \times Si + Mn + 0.45 \times Ni + 0.8 \times Cr)} \tag{1}$$

$$\text{Effective amount of B} = 10.81 \times (B/10.81 - \text{solid solution N amount}/14.01) \tag{2}$$

$$\text{Solid solution N amount} = 14.01 \times (N/14.01 - Ti/47.88) \tag{3}$$

Each element symbol in the above Expression (1) is the content of the element in % by mass and 0 is substituted when the element is not contained.

B in the above Expression (2) is the B content in % by mass. When the effective amount of B is a negative value, the effective amount of B is set to 0.

N and Ti in the above Expression (3) are the contents in % by mass, respectively. When the solid solution N amount is a negative value, the solid solution N amount is set to 0.

The microstructure of the hot-rolled steel sheet according to the embodiment will be descried below.

In the hot-rolled steel sheet according to the embodiment, the microstructure contains, in area ratio, at a location at ¼ a sheet thickness,
a total amount of 90% or more of one or more of martensite and tempered martensite and
a total amount of 10% or less of one or more of ferrite, bainite, and pearlite,
at a location of 200 μm from the surface,
a total amount of 70% or more and less than 90% of one or more of martensite and tempered martensite and
a total amount of more than 10% and 30% or less of one or more of ferrite, bainite, and pearlite.

Each rule will be described in detail below.

Location at ¼ Sheet Thickness

In the embodiment, a location at ¼ a sheet thickness specifically refers to a region from a location at ¼ a sheet thickness to 10 μm on the front and back sides, that is, a location at ¼-10 μm a sheet thickness from the surface to a location at ¼+10 μm the sheet thickness from the surface. In other words, the location at ¼ a sheet thickness is a region whose starting point is the location at ¼-10 μm a sheet thickness from the surface and whose ending point is the location at ¼+10 μm the sheet thickness from the surface.

Total Amount of 90% or More of One or More Martensite and Tempered Martensite

Martensite and tempered martensite have hard, homogeneous, and fine structures. High strength can be obtained by including these structures. If a total area ratio of these structures is less than 90%, a desired strength cannot be obtained. For this reason, a total area ratio of these structures is set to 90% or more. It is not necessary to include both martensite and tempered martensite, and even if only one of them is included, the area ratio may be 90% or more. A total area ratio of martensite and tempered martensite is preferably 92% or more or 95% or more. More preferably it is 100%.

Total Amount of 10% or Less of One of More of Ferrite, Bainite, and Pearlite

The hot-rolled steel sheet according to the embodiment may contain ferrite, bainite, and pearlite as the remainder structure other than martensite and tempered artensite in the microstructure at a position of ¼ a sheet thickness. If a total area ratio is more than 10%, the strength of the hot-rolled steel sheet decreases. For this reason, the total area ratio of ferrite, bainite, and pearlite is 10% or less, preferably 8% or less and 5% or less, and more preferably 0%.

The hot-rolled steel sheet need not contain all of ferrite, bainite, and pearlite.

Location of 200 μm from Surface

In the embodiment, a location of 200 μm from the surface specifically refers to a region of 10 μm on the front and back sides from a "location of 200 μm from the surface," that is, a location of 200 μm−10 μm (190 μm) from the surface to a location of 200 μm+10 μm (210 μm) from the surface. In other words, the location of 200 μm from the surface is a region whose starting point is a location of 190 μm in a sheet thickness direction from the surface and whose ending point is a location of 210 μm in the sheet thickness direction from the surface.

Total Amount of 70% or More and Less than 90% of One or More of Martensite and Tempered Martensite As described above, martentise and tempered martensite have hard, homogeneous, and fine structures. Although these structures are suitable for obtaining high strength, the bendability of the structures deteriorates. In the hot-rolled steel sheet according to the embodiment, in order to obtain a desired bendability, an area ratio of martensite and tempered martensite at a location of 200 μm from the surface is made smaller than an area ratio of martensite and tempered martensite at a location at ¼ a sheet thickness. If a total area ratio of martensite and tempered martensite at the location of 200 μm from the surface is 90% or more, the bendability of the hot-rolled steel sheet deteriorates. For this reason, the total area ratio of these structures is set to less than 90%, and preferably 87% or less or 85% or less.

If the total area ratio of martensite and tempered martensite is less than 70%, a desired strength cannot be obtained. For this reason, the total area ratio of these structures is 70% or more, and preferably 75% or more.

Also, a difference between a total area ratio of martensite and tempered martensite at a location at ¼ a sheet thickness and a total area ratio of martensite and tempered martensite at a location of 200 μm from the surface (="total area ratio of martensite and tempered martensite at location of ¼ sheet thickness"−"total area ratio of martensite and tempered martensite at location of 200 μm from surface") is preferably 5% or more, and more preferably 10% or more or 15% or more.

It is not necessary to include both martensite and tempered martensite, and even if only one of them is included, the area ratio may be 70% or more and less than 90%.

More than 10% and 30% or Less of One of More of Ferrite, Bainite, and Pearlite

The hot-rolled steel sheet according to the embodiment may contain ferrite, bainite, and pearlite as the remainder structure other than martensite and tempered martensite in the microstructure at a location of 200 μm from the surface. Although the strength of these structures deteriorates, the structures have excellent bendability. If a total area ratio of these structures is 10% or less, excellent bendability cannot be obtained. For this reason, the total area ratio of these structures is more than 10%, and preferably 15% or more. It is not necessary to contain all of ferrite, bainite, and pearlite, and even if only one of them is contained, the content thereof may be more than 10%.

Also, if the total area ratio of these structures is more than 30%, a desired strength cannot be obtained. For this reason, the total area ratio of these structures is set to 30% or less, and preferably 25% or less.

In the embodiment, the microstructure at the location of 100 μm from the surface may be controlled, in addition to the microstructure at the location at ¼ a sheet thickness and the microstructure at the location of 200 μm from the surface.

It is preferable that the microstructure at the location of 100 μm from the surface contains a total amount of 60 to 80% of one or more of martensite and tempered martensite and a total amount of 20 to 40% of one or more of ferrite, bainite, and pearlite.

Location of 100 μm from Surface

In the embodiment, a location of 100 μm from the surface specifically refers to a region of 10 μm on the front and back sides from a "location of 100 μm from the surface," that is, a location of 100 μm−10 μm (90 μm) from the surface to a location of 100 μm+10 μm (110 μm) from the surface. In other words, the location of 100 μm from the surface is a region whose starting point is a location of 90 µm in the sheet thickness direction from the surface and whose ending point is a location of 110 µm in the sheet thickness direction from the surface.

Total Amount of 60 to 80% of One or More of Martensite and Tempered Martensite

The bendability of the hot-rolled steel sheet can be enhanced by setting the total area ratio of martensite and tempered martensite to 80% or less. For this mason, the total area ratio of these structures is preferably 80% or less.

The strength can be increased by setting the total area ratio of martensite and tempered martensite to 60% or more. For this reason, the total area ratio of these structures is preferably 60% or more.

It is not necessary to contain both martensite and tempered martensite, and even if only one of them is contained, the area ratio may be 60 to 80%.

Total 20 to 40% of One or More of Ferrite, Bainite, and Pearlite

The hot-rolled steel sheet according to the embodiment may contain ferrite, bainite, and pearlite as the remainder structure other than martensite and tempered martensite in the microstructure at a location of 100 µm from the surface. The bendability can be enhanced by setting the total area ratio of these structures to 20% or more. For this reason, the total area ratio of these structures is preferably 20% or more. It is not necessary to contain all of ferrite, bainite, and pearlite, and even if only one of them is contained, the content thereof may be 20% or more.

Also, the strength can be increased by setting the total area ratio of these structures to 40% or less. For this reason, the total area ratio of these structures is preferably 40% or less.

A method of measuring an area ratio of each of the structures will be described below.

A test piece is taken from a hot-rolled steel sheet so that microstructures at a location of 100 µm from the surface, a location of 200 µm from the surface, and a location at ¼ a sheet thickness from the surface in a sheet thickness cross section parallel to a rolling direction can be observed.

A cross section of the test piece is polished using #600 to #1500 silicon carbide paper and then is finished to have a mirror surface using a liquid obtained by dispersing diamond powder with particle sizes of 1 to 6 µm in a dilute solution such as alcohol or pure water. Subsequently, polishing is performed using colloidal silica in which an alkaline solution is not contained at room temperature and the strain introduced to the surface layer of the sample is removed. Crystal orientation information is obtained by measuring a rolling direction of 150 µm×sheet thickness direction of 20 µm at an arbitrary location of a cross section of the sample in a longitudinal direction at measurement intervals of 0.1 µm through an electron backscattering diffraction method.

For the measurement, an EBSD analysis device composed of a thermal field emission scanning electron microscope (JSM-7001F manufactured by JEOL) and an EBSD detector (DVC5 type detector manufactured by TSL) is used. At this time, a degree of vacuum in the EBSD analysis device is $9.6 \times 10^{-5}$ Pa or less, an acceleration voltage is 15 kV, an irradiation current level is 13, and an electron beam irradiation level is 62. The obtained pieces of crystal orientation information are analyzed using a "Phase Map" function installed in software "OIM Analysis (registered trademark)" attached to the EBSD analysis device and the pieces of information having a crystal structure of bcc are determined as bainite, ferrite, and "pearlite, martensite, and tempered martensite."

For these regions, regions in which a "Grain Orientation Spread" is 1° or less are extracted as ferrite under the conditions that the 15° grain boundary is defined as a grain boundary using the "Grain Orientation Spread" function installed in the software "OIM Analysis (registered trademark)" attached to the EBSD analysis device. An area ratio of ferrite is obtained by calculating an area ratio of the extracted ferrite.

Subsequently, regions which are more than Iα/2 are extracted as bainite and regions which are Iα/2 or less are extracted as "pearlite, martensite, and tempered martensite" when a maximum value of "Grain Average IQ" of a ferrite region is Iα under the conditions that a 5° grain boundary is defined as a grain boundary in the remainder region (region in which "Grain Orientation Spread" is more than 1°). An area ratio of bainite is obtained by calculating an area ratio of the extracted bainite.

With regard to the extracted "pearlite, martensite, and tempered martensite," pearlite, martensite, and tempered martensite can be distinguished through a method which will be described blow.

First, in order to observe the same region as the EBSD measurement region using a SEM, Vickers indentation is stamped in the vicinity of an observation location. After that, the contamination on a surface layer is removed through polishing so that the structure on an observation surface is left and etching is performed with nital. Subsequently, the same field of view as the EBSD observation surface is observed through a SEM at a magnification of 3000 times.

In the EBSD measurement, a region which has a substructure in a grain and in which cementite is precipitated with a plurality of variants in the region determined as "pearlite, martensite, and tempered martensite" is determined as tempered martensite.

A region in which cementite precipitates in a lamellar shape is determined as pearlite.

A region in which the luminance is large and the lower structure is not revealed through etching is determined to be martensite.

Each of the area ratios of tempered martensite, pearlite, and martensite is obtained by calculating each of the area ratios.

The contamination of the surface layer of the observation surface may be removed through buffing using alumina particles with a particle size of 0.1 µm or less or a method such as Ar ion sputtering.

The area ratio of the microstructure at each location is obtained by performing the above measurement at a location of 100 µm from the surface, a location of 200 µm from the surface, and a location at ¼ a sheet thickness from the surface.

It is preferable that the hot-rolled steel sheet according to the embodiment have an average aspect ratio of prior austenite grains of 1.0 to 3.0 in the microstructure at a location at ¼ a sheet thickness.

Also, in the microstructure at the location at ¼ a sheet thickness, the average grain size of the prior austenite grains is preferably 5 to 40 µm.

Average Aspect Ratio: 1.0 to 3.0 of Prior Austenite Grains: 1.0 to 3.0

In the microstructure at a location at ¼ a sheet thickness, the anisotropy in the characteristics can be reduced by setting an average aspect ratio of prior austenite grains to 1.0 to 3.0, and as a result, the bendability of the hot-rolled steel sheet can be further increased.

The aspect ratios of the prior austenite grains are values obtained by dividing long axes of the prior austenite grains by short axes thereof and values of 1.0 or more are taken. As the aspect ratio decreases, the crystal grains are equiaxed, and as the aspect ratio increases, the crystal grains become flat. The aspect ratio is an index representing a degree of anisotropy of the characteristics.

Average Grain Size of Prior Austenite Grains: 5 to 40 μm

The bendability can be further improved by setting the average grain size of the prior austenite grains to 5 to 40 μm in the microstructure at the location at ¼ the sheet thickness.

A method of measuring an average aspect ratio and an average grain size of prior austenite grains at a location at ¼ a sheet thickness will be described below.

A test piece is taken from a hot-rolled steel sheet so that the microstructure can be observed at the location at ¼ a sheet thickness from the surface in a cross section in a sheet thickness parallel to a rolling direction. Prior austenite grain boundaries are revealed by corroding an observation surface using a picric acid saturated aqueous solution. 5 or more fields of view of 100 μm×100 μm of an enlarged photograph at a location at ¼ a sheet thickness from the surface of a corrosion-treated cross section parallel to the rolling direction are photographed at a magnification of 1000 times using a scanning electron microscope (SEM). Equivalent circle diameters (diameters) of at least 20 prior austenite grains having an equivalent circle diameter (diameter) of 2 μm or more included in each SEM photograph are obtained through image processing. An average grain size of the prior austenite grains is obtained by calculating these average values. When prior austenite grains with an equivalent circle diameter of less than 2 μm are included, the above measurements are performed excluding them.

Also, long axes and short axes of at least 20 prior austenite grains having an equivalent circle diameter (diameter) of 2 μm or more, which are included in each of the above SEM photographs, are measured. An average long axis and an average short axis of the prior austenite grains are obtained by calculating average values of the long axes and the short axes obtained by measuring each of the prior austenite grains. An average aspect ratio of the prior austenite grains is obtained by calculating these ratios (average long axis/average short axis).

Tensile Strength: 980 MPa or More

The hot-rolled steel sheet according to the embodiment may have a tensile (maximum) strength of 980 MPa or more. It is possible to make a greater contribution to reducing a weight of a vehicle body without limiting components to which the present invention can be applied by setting the tensile strength to 980 MPa or more. More preferably, the tensile strength is 1000 MPa or more and 1100 MPa or more.

An upper limit is not particularly limited, but may be 1470 MPa from the viewpoint of mold wear suppression.

Tensile strength is measured in accordance with JIS Z 2241:2011 using No. 5 test piece of JIS Z 2241:2011. A sampling location of the tensile test piece is a central location in a plate width direction and a direction perpendicular to the rolling direction may be the longitudinal direction.

R/t: 1.5 or Less

The hot-rolled steel sheet according to the embodiment may have a ratio R/t of 1.5 or less between a limit bending radius R and a sheet thickness t obtained through a test conforming to a V-block method which will be described later. If R/t is 1.5 or less, it can be determined that the hot-rolled steel sheet has excellent bendability.

R/t is obtained through the following method.

A 100 mm×30 mm strip-shaped test piece is cut out from a location of ½ a width direction of the hot-rolled steel sheet. For bending (L-axis bending) in which a bending ridge line is parallel to the rolling direction (L direction), a test is performed in accordance with the V-block method (bending angle θ is 90°) of JIS Z 2248:2006. A critical bending R/t is obtained by obtaining a minimum bending radius R in which cracks do not occur and dividing the obtained minimum bending radius R by a sheet thickness t.

Here, for the presence or absence of cracks, cracks are observed by observing a bent surface of the test piece after a V-block 90° bending test with a magnifying glass or an optical microscope at a magnification of 10 times or more, and when a crack length observed on the bending surface of the test piece is more than 0.5 mm, it is determined that there is a crack.

Sheet Thickness: More than 0.8 mm and 8.0 mm or Less

A sheet thickness of the hot-rolled steel sheet according to the embodiment is not particularly limited, but may be more than 0.8 mm and 8.0 mm or less. If the sheet thickness of the hot-rolled steel sheet is 0.8 mm or less, it may become difficult to secure a rolling completion temperature and a rolling load may become excessive, making hot rolling difficult in some cases. Therefore, the sheet thickness of the hot-rolled steel sheet according to the embodiment may be more than 0.8 mm, and preferably 1.2 mm or more or 1.4 mm or more.

On the other hand, if the sheet thickness is more than 8.0 mm, it may be difficult to obtain the microstructure described above in some cases. Therefore, the sheet thickness may be 8.0 mm or less, and preferably 6.0 mm or less.

Plated Layer

The hot-rolled steel sheet according to the embodiment having the chemical composition and the microstructure described above may be a surface-treated steel sheet by providing a plated layer onto a surface for the purpose of improving corrosion resistance. The plated layer may be an electroplated layer or a hot-dipped plated layer. Examples of the electroplated layer include electrogalvanizing, electrolytic Zn—Ni alloy plating, and the like. Examples of the hot-dipped layer include hot dip galvanizing, alloyed hot dip galvanizing, hot-dip aluminum plating, hot-dip Zn—Al alloy plating, hot-dip Zn—Al—Mg alloy plating, hot-dip Zn—Al—Mg—Si alloy plating, and the like. An amount of plating to be deposited is not particularly limited and may be the same as that in the related art. Furthermore, corrosion resistance can be further increased by applying an appropriate chemical conversion treatment (for example, applying a silicate-based chromium-free chemical conversion treatment solution and drying it) after plating.

A preferred method of producing a hot-rolled steel sheet according to the embodiment will be described below. A temperature of a slab and a temperature of a steel sheet in the embodiment refer to a surface temperature of a slab and a surface temperature of a steel sheet.

The preferred method of producing a hot-rolled steel sheet according to the embodiment includes the following steps.

A slab having the above chemical composition is heated to a temperature range of 1100 to 1250° C.

Rough rolling is performed so that a rough rolling completion temperature is 1000 to 1100° C.

Finish rolling is performed so that the following conditions are satisfied.

(I) A steel sheet tension between a final pass and a pass one pass before the final pass is 2.0 to 5.0 kg/mm².

(II) A finish rolling completion temperature FT is $Ac_3$ point+10° C. to $Ac_3$ point+30° C.

(III) A rolling reduction rate of the final pass is 20 to 40%.

Cooling is performed so that an average cooling rate in a temperature range from the finish rolling completion temperature FT to Ms point is Vc+10° C./s to Vc+40° C./s.

Cooling is stopped in a temperature range of Ms point—200° C. or lower and then winding is performed.

Here, in the finishing rolling, it is more preferable to satisfy the condition that (IV) a cumulative rolling reduction rate is 75 to 95%.

Each step will be described in detail below.

Heating Temperature of Slab: 1100 to 1250° C.

It is preferable to heat a slab with the above chemical composition to a temperature range of 1100 to 1250° C. When a heating temperature of the slab is lower than 1100° C., the deformation resistance in hot rolling may be high and a rolling load may increase in some cases. For this reason, the heating temperature of 1100° C. or higher is preferable.

On the other hand, if the heating temperature is higher than 1250° C., the prior austenite grains may coarsen, reducing a low temperature toughness of the hot-rolled steel sheet in some cases. For this reason, the heating of 1250° C. or lower is preferable.

It is preferable that the slab to be heated is produced through continuous casting from the viewpoint of production cost, but it may be produced through other casting methods (for example, ingot casting method).

Rough Rolling Completion Temperature: 1000 to 1100° C.

Hot rolling is roughly divided into rough rolling and finishing rolling. Making the slab a rough bar of desired dimensions and shape and making it easy to adjust the finish rolling completion temperature within the desired range, it is desirable that rough rolling be performed so that the rough rolling completion temperature is 1000 to 1100° C.

Finish Rolling (1) A steel sheet tension between a final pass and a pass one pass before the final pass: 2.0 to 5.0 kg/mm²

In finish rolling, friction preferably occurs between the mill rolls and the surface layer region of the steel sheet by setting the steel sheet tension between the final pass and the pass one pass before the final pass to 2.0 kg/mm² or more and loading shear strain can be introduced in the surface layer region. As a result, a desired microstructure can be obtained at a location of 200 μm from the surface. If the steel sheet tension is more than 5.0 kg/mm², the steel sheet may break and finish rolling may not be performed stably in some cases.

The steel sheet tension may be adjusted by increasing the number of rotations of the final pass and/or the pass one pass before that final pass or by increasing louvers.

(II) Finish Rolling Completion Temperature FT: $Ac_3$ Point+10° C. to $Ac_3$ Point+30° C.

It is possible to prevent the formation of a large amount of ferrite and bainite at a location of 200 μm from the surface by setting the finish rolling completion temperature FT to $Ac_3$ point+10° C. or higher, and as a result, it is possible to obtain desired amounts of martensite and tempered martensite. Furthermore, the strain of the surface layer region to be provided under the reduction in the final pass in the finish rolling can be prevented from being released by setting the finish rolling completion temperature FT to $Ac_3$ point+30° C. or lower. As a result, an excessive amount of martensite at a location of 200 μm from the surface can be prevented.

In the embodiment, the $Ac_3$ point is represented by the following expression:

$$Ac_3+937.2-436.5 \times C+56 \times Si-19.7 \times Mn-16.3 \times Cu-26.6 \times Ni-4.9 \times Cr+124.8 \times V+136.3 \times Ti-19.1 \times Nb+198.4 \times Al+3315 \times B.$$

Each element symbol in the above expression indicates the content of the element in % by mass and 0 is substituted when it is not contained.

(III) Rolling Reduction Rate in Final Pass: 20 to 40%

In order to obtain a desired amount of martensite at a location of 200 μm from the surface, the final pass rolling reduction rate is preferably 20 to 40%. A sufficient driving force for ferrite, bainite, and pearlite transformations can be ensured without insufficient amount of the strain introduced into the surface layer region by setting the rolling reduction rate to 20% or more. Furthermore, it is possible to minimize an excessive driving force for ferrite, bainite, and pearlite transformations by setting the rolling reduction rate to 40% or less. As a result, it is possible to preferably control the microstructure at a location of 200 μm from the surface.

The rolling reduction rate of the final pass of the finish rolling is obtained by dividing a sheet thickness $t_0$ of a steel sheet before the final pass by a sheet thickness $t_1$ of the steel sheet after the final pass $((1-t_0/t_1) \times 100)$.

(IV) Cumulative Rolling Reduction Rate: 75 to 95%

This condition is a more preferable condition. A cumulative rolling reduction rate in the finish rolling is obtained by dividing a sheet thickness $t_1$ of the steel sheet before the finish rolling by a sheet thickness $t_f$ of the steel sheet after completion of the finish rolling $((1-t_1/t_f) \times 100)$. An average grain size and an average aspect ratio of the prior austenite grains can be preferably controlled by setting the cumulative rolling reduction rate of the finish rolling to 75 to 95%.

Average cooling rate in temperature range at finish rolling completion temperature FT to Ms point: Vc+10° C./s to Vc+40° C./s After finish rolling is completed, a desired microstructure is obtained by performing cooling using water to a temperature range in which austenite transforms to martensite. If an average cooling rate is too slow, ferrite and/or bainite may form during a cooling process, reducing the strength of the hot-rolled steel sheet in some cases. For this reason, the average cooling rate in the temperature range at the finish rolling completion temperature FT to Ms point is preferably Vc+10° C./s or faster. Furthermore, if the average cooling rate is too fast, a desired amount of martensite in the surface layer region may not obtained in some cases. As a result, excellent bendability may not be obtained in some cases. Thus, it may not be possible to preferably control the microstructure at a location of 200 μm from the surface. For this reason, the average cooling rate in the temperature range at the finish rolling completion temperate FT to Ms point is set to Vc+40° C./s or lower.

It is preferable that water cooling at the average cooling rate be performed up to a cooling stop temperature which will be described later.

The average cooling rate mentioned herein is a value obtained by dividing a temperature difference between a starting point and an ending point in a set range by an elapsed time from the starting point to the ending point.

Vc is represented by the above Expressions (1) to (3).

The Ms point is represented by the following expression:

$$Ms=561-474 \times C-33 \times Mn-17 \times Ni.$$

Each element symbol in the above expression indicates the content of the element in % by mass and 0 is substituted when it is not contained.

Cooling Stop Temperature (Winding Temperature): Ms Point—200° C. or Lower

The cooling stop temperature is preferably Ms point—200° C. or lower. The cooling stop temperature is more preferably Ms point—250° C. or lower, and even more preferably Ms point—300° C. or lower. After cooling is stopped, winding is performed.

Although the lower limit of the cooling stop temperature is not particularly limited, it may be room temperature (25° C.).

The hot-rolled steel sheet according to the embodiment can be manufactured through the method described above. If necessary, the plated layer described above may be formed on the surface of the hot-rolled steel sheet.

EXAMPLE

Slabs having chemical compositions shown in Tables 1A and 1B were produced through continuous casting. Hot-rolled steel sheets shown in Tables 3A and 3B were produced under the conditions shown in Tables 2A and 2B using the obtained slab. Winding was performed immediately after cooling to cooling stop temperatures listed in Tables 2A and 2B.

For the obtained hot-rolled steel sheets, a microstructure, a tensile strength, and R/t were measured at a location at ¼ a sheet thickness, a location of 200 μm from the surface, and a location of 100 μm from the surface through the above method. Furthermore, a total elongation (%) was obtained from a tensile test performed through the above method.

The obtained results are shown in Tables 3A and 3B. A steel sheet tension indicates a steel sheet tension between a final pass and a pass one pass before the final pass. In addition, M indicates martensite, TM indicates tempered martensite, F indicates ferrite, B indicates bainite, and P indicates pearlite. In some cases, the abundance of ferrite, bainite, and pearlite obscured the morphology of prior austenite grains. Thus, an average aspect ratio and an average grain size of prior austenite grains at a location at ¼ a sheet thickness could not be measured.

When the tensile strength was 980 MPa or more, it was determined as having high strength. On the other hand, when the tensile strength was less than 980 MPa, it was determined to be unsatisfactory due to inferior strength.

When R/t was 1.5 or less, it was determined as being excellent in bendability and passed. On the other hand, when R/t was more than 1.5, it was determined to be unsatisfactory due to poor bendability.

When the total elongation was 8.5% or more, it was determined as having excellent ductility and passed.

TABLE 1A

| | Chemical Composition (% by mass) remainder contains Fe and impurities | | | | | | | | | |
|---|---|---|---|---|---|---|---|---|---|---|
| Steel | C | Si | Mn | P | S | N | Al | Ti | B | Nb |
| A | 0.072 | 0.05 | 2.11 | 0.011 | 0.003 | 0.0035 | 0.029 | 0.010 | 0.0021 | |
| B | 0.052 | 0.05 | 2.11 | 0.009 | 0.003 | 0.0035 | 0.028 | 0.010 | 0.0019 | |
| C | 0.140 | 0.05 | 1.90 | 0.011 | 0.003 | 0.0031 | 0.031 | 0.005 | 0.0019 | |
| D | 0.061 | 0.05 | 2.31 | 0.011 | 0.003 | 0.0032 | 0.032 | 0.010 | 0.0013 | |
| E | 0.080 | 0.05 | 1.09 | 0.010 | 0.003 | 0.0031 | 0.028 | 0.010 | 0.0018 | |
| F | 0.090 | 0.05 | 1.55 | 0.010 | 0.003 | 0.0034 | 0.029 | 0.005 | 0.0021 | |
| G | 0.090 | 0.05 | 2.30 | 0.090 | 0.003 | 0.0037 | 0.029 | 0.015 | 0.0021 | |
| H | 0.140 | 0.05 | 2.45 | 0.010 | 0.003 | 0.0038 | 0.028 | 0.002 | 0.0005 | |
| I | 0.070 | 0.05 | 2.10 | 0.010 | 0.003 | 0.0039 | 0.029 | 0.002 | 0.0040 | |
| J | 0.130 | 0.05 | 2.10 | 0.010 | 0.003 | 0.0041 | 0.031 | 0.050 | 0.0030 | |
| K | 0.071 | 0.05 | 2.11 | 0.009 | 0.002 | 0.0034 | 0.028 | 0.005 | 0.0020 | 0.015 |
| L | 0.071 | 0.05 | 2.08 | 0.009 | 0.002 | 0.0034 | 0.028 | 0.005 | 0.0020 | |
| M | 0.071 | 0.05 | 2.12 | 0.009 | 0.002 | 0.0034 | 0.028 | 0.005 | 0.0020 | |
| N | 0.090 | 0.05 | 2.48 | 0.010 | 0.020 | 0.0030 | 0.030 | 0.004 | 0.0020 | |
| O | 0.080 | 0.05 | 1.42 | 0.010 | 0.020 | 0.0037 | 0.030 | 0.010 | 0.0015 | |
| P | 0.041 | 0.21 | 1.60 | 0.009 | 0.003 | 0.0035 | 0.031 | 0.021 | 0.0021 | |

| | Chemical Composition (% by mass) remainder contains Fe and impurities | | | | | | | | |
|---|---|---|---|---|---|---|---|---|---|
| Steel | Cr | V | Cu | Ni | Ca | Solid solution N amount | Effective amount of B | Vc | Remarks |
| A | | | | | | 0.001 | 0.0017 | 16 | Steel in present invention |
| B | | | | | | 0.001 | 0.0015 | 17 | Steel in present invention |
| C | | | | | | 0.002 | 0.0006 | 16 | Steel in present invention |
| D | | | | | | 0.000 | 0.0011 | 12 | Steel in present invention |
| E | 0.91 | | | | | 0.000 | 0.0017 | 25 | Steel in present invention |
| F | | | | | | 0.002 | 0.0006 | 38 | Steel in present invention |

TABLE 1A-continued

| Steel | | | | | | | Remarks |
|---|---|---|---|---|---|---|---|
| G | | | | | 0.000 | 0.0021 | 10 | Steel in present invention |
| H | | | | | 0.003 | 0.0000 | 36 | Steel in present invention |
| I | | | | | 0.003 | 0.0014 | 16 | Steel in present invention |
| J | | | | | 0.000 | 0.0030 | 12 | Steel in present invention |
| K | | | | | 0.002 | 0.0005 | 16 | Steel in present invention |
| L | | 0.10 | | | 0.002 | 0.0005 | 17 | Steel in present invention |
| M | 0.05 | | 0.05 | 0.05 | 0.0020 | 0.002 | 0.0005 | 14 | Steel in present invention |
| N | | | | | 0.002 | 0.0006 | <u>8</u> | Comparative steel |
| O | | | | | 0.001 | 0.0009 | <u>50</u> | Comparative steel |
| P | | | | | 0.000 | 0.0021 | 39 | Comparative steel |

Values outside of the range of the present invention are underlined.

TABLE 1B

Chemical Composition (% by mass) remainder contains Fe and impurities

| Steel | C | Si | Mn | P | S | N | Al | Ti | B | Nb | Cr | V | Cu | Ni | Ca | Solid solution N amount | Effective amount of B | Vc | Remarks |
|---|---|---|---|---|---|---|---|---|---|---|---|---|---|---|---|---|---|---|---|
| Q | <u>0.163</u> | 0.31 | 1.80 | 0.011 | 0.003 | 0.0037 | 0.032 | 0.030 | 0.0017 | | | | | | | 0.000 | 0.0017 | 15 | Comparative steel |
| R | 0.095 | 0.95 | 1.60 | 0.010 | 0.003 | 0.0031 | 0.031 | 0.015 | 0.0014 | | | | | | | 0.000 | 0.0014 | 18 | Steel in present invention |
| S | 0.130 | 0.10 | <u>2.61</u> | 0.011 | 0.003 | 0.0031 | 0.003 | 0.030 | 0.0020 | | | | | | | 0.000 | 0.0020 | <u>5</u> | Comparative steel |
| T | 0.112 | 0.05 | 1.95 | 0.011 | 0.003 | 0.0033 | 0.029 | 0.095 | 0.0020 | | | | | | | 0.000 | 0.0020 | 17 | Steel in present invention |
| XA | 0.095 | <u>1.05</u> | 1.60 | 0.010 | 0.003 | 0.0031 | 0.031 | 0.015 | 0.0014 | | | | | | | 0.000 | 0.0014 | 17 | Comparative steel |
| XB | 0.120 | 0.05 | <u>0.95</u> | 0.011 | 0.003 | 0.0032 | 0.033 | 0.020 | 0.0025 | | | | | | | 0.000 | 0.0025 | <u>93</u> | Comparative steel |
| XC | 0.112 | 0.05 | 1.70 | 0.011 | 0.003 | 0.0033 | 0.029 | <u>0.110</u> | 0.0020 | | | | | | | 0.000 | 0.0020 | 26 | Comparative steel |
| XD | 0.098 | 0.10 | 1.80 | 0.009 | 0.003 | 0.0035 | 0.028 | 0.010 | 0.0019 | | | | | | | 0.001 | 0.0015 | 23 | Steel in present invention |
| XE | 0.056 | 0.02 | 2.41 | 0.012 | 0.003 | 0.0032 | 0.031 | 0.020 | 0.0020 | | | | | | | 0.000 | 0.0020 | 10 | Steel in present invention |
| XF | 0.071 | 0.04 | 2.40 | 0.009 | 0.003 | 0.0041 | 0.032 | 0.030 | 0.0021 | | | | | | | 0.000 | 0.0021 | <u>10</u> | Comparative steel |
| XG | 0.142 | 0.06 | 2.15 | 0.012 | 0.003 | 0.0038 | 0.032 | 0.040 | 0.0023 | 0.02 | | | | | | 0.000 | 0.0023 | 11 | Steel in present invention |
| XH | 0.091 | 0.04 | 2.30 | 0.011 | 0.003 | 0.0042 | 0.003 | 0.010 | 0.0024 | | | | | | | 0.001 | 0.0014 | 10 | Steel in present invention |

TABLE 1B-continued

| | Chemical Composition (% by mass) remainder contains Fe and impurities | | | | | | | | | | | | | | | Solid solution N amount | Effective amount of B | Vc | Remarks |
|---|---|---|---|---|---|---|---|---|---|---|---|---|---|---|---|---|---|---|---|
| Steel | C | Si | Mn | P | S | N | Al | Ti | B | Nb | Cr | V | Cu | Ni | Ca | | | | |
| XI | 0.130 | 0.03 | 2.45 | 0.011 | 0.003 | 0.0042 | 0.031 | — | 0.0020 | | | | | | | 0.004 | 0.0000 | 38 | Comparative steel |
| XJ | 0.140 | 0.06 | 2.49 | 0.010 | 0.003 | 0.0041 | 0.029 | 0.002 | — | | | | | | | 0.004 | 0.0000 | 33 | Comparative steel |
| XK | 0.089 | 0.06 | 1.80 | 0.010 | 0.003 | 0.0040 | 0.029 | 0.020 | <u>0.0051</u> | | | | | | | 0.000 | 0.0051 | 25 | Comparative steel |
| XL | 0.091 | 0.51 | 2.01 | 0.011 | 0.003 | 0.0041 | 0.031 | 0.050 | 0.0010 | 0.01 | | | | | | 0.000 | 0.0010 | 12 | Steel in present invention |

Values outside of the range of the present invention are underlined.

TABLE 2A

| | | Coarse rolling | | Finish rolling | | | | | Cooling | | | |
|---|---|---|---|---|---|---|---|---|---|---|---|---|
| | | | | | | | | | Average | | | |
| No. | Type of steel | Heating temperature ° C. | Coarse rolling completion temperature ° C. | Ac₃ (° C.) | Finish rolling completion temperature FT ° C. | Steel plate tensile strength kg/mm² | Rolling reduction rate of final pass % | Accumulative rolling reduction rate % | cooling rate in temperature range at FT to Ms point ° C./s Vc | Ms (° C.) | Cooling step temperature ° C. | Remarks |
| 1 | A | 1250 | 1090 | 881 | 911 | 2.1 | 32 | 88 | 16 | 30 | 457 | 105 | Example of present invention |
| 2 | B | 1250 | 1040 | 889 | 908 | 2.2 | 33 | 92 | 17 | 30 | 467 | 102 | Example of present invention |
| 3 | C | 1250 | 1040 | 855 | 880 | 2.1 | 31 | 87 | 16 | 30 | 432 | 98 | Example of present invention |
| 4 | D | 1250 | 1040 | 880 | 907 | 2.3 | 30 | 92 | 12 | 30 | 456 | 112 | Example of present invention |
| 5 | E | 1250 | 1040 | 892 | 920 | 2.1 | 25 | 88 | 25 | 40 | 487 | 110 | Example of present invention |
| 6 | F | 1250 | 1040 | 884 | 911 | 2.3 | 24 | 90 | 38 | 50 | 467 | 98 | Example of present invention |
| 7 | G | 1250 | 1040 | 870 | 897 | 2.4 | 37 | 88 | 10 | 30 | 442 | 95 | Example of present invention |
| 8 | H | 1250 | 1040 | 838 | 860 | 2.1 | 39 | 90 | 36 | 48 | 414 | 78 | Example of present invention |
| 9 | I | 1250 | 1040 | 887 | 910 | 2.4 | 36 | 92 | 16 | 30 | 459 | 98 | Example of present invention |
| 10 | J | 1250 | 1040 | 865 | 890 | 2.5 | 32 | 75 | 12 | 30 | 430 | 98 | Example of present invention |
| 11 | K | 1250 | 1040 | 880 | 910 | 2.2 | 31 | 80 | 16 | 30 | 458 | 80 | Example of present invention |
| 12 | L | 1250 | 1040 | 893 | 920 | 2.1 | 28 | 78 | 17 | 30 | 459 | 99 | Example of present invention |
| 13 | M | 1250 | 1040 | 878 | 900 | 2.1 | 23 | 92 | 14 | 30 | 457 | 96 | Example of present invention |
| 14 | <u>N</u> | 1240 | 1040 | 865 | 891 | 2.0 | 40 | 88 | <u>8</u> | 30 | 437 | 95 | Comparative Example |
| 15 | <u>O</u> | 1240 | 1040 | 889 | 901 | 2.0 | 40 | 86 | <u>50</u> | 60 | 476 | 92 | Comparative Example |
| 16 | A | 1250 | 1040 | 881 | <u>880</u> | 2.1 | 33 | 92 | 16 | 40 | 457 | 113 | Comparative Example |
| 17 | A | 1250 | 1040 | 881 | <u>980</u> | 2.1 | 32 | 91 | 16 | 40 | 457 | 110 | Comparative Example |
| 18 | A | 1250 | 1040 | 881 | 900 | <u>1.5</u> | 31 | 83 | 16 | 40 | 457 | 98 | Comparative Example |
| 19 | A | 1250 | 1040 | 881 | 901 | 2.2 | <u>18</u> | 80 | 16 | 40 | 457 | 99 | Comparative Example |

Symbols and values outside of the preferred range are underlined.

TABLE 2B

| No. | Type of steel | Coarse rolling Heating temperature ° C. | Coarse rolling completion temperature ° C. | Ac₃ ° C. | Finish rolling Finish rolling completion temperature FT ° C. | Steel plate tensile strength kg/mm² | Rolling reduction rate of final pass % | Accumulative rolling reduction rate % | Vc | Cooling Average cooling rate in temperature range at FT to Ms point ° C./s | Ms (° C.) | Cooling step temperature ° C. | Remarks |
|---|---|---|---|---|---|---|---|---|---|---|---|---|---|
| 20 | A | 1250 | 1040 | 881 | 903 | 2.1 | <u>45</u> | 93 | 16 | 45 | 457 | 80 | Comparative example |
| 21 | A | 1250 | 1040 | 881 | 909 | 2.2 | 28 | 88 | 16 | <u>70</u> | 457 | 98 | Comparative example |
| 22 | A | 1250 | 1040 | 881 | 911 | 2.1 | 31 | 88 | 16 | <u>5</u> | 457 | 100 | Comparative example |
| 23 | P | 1250 | 1040 | 916 | 939 | 2.2 | 30 | 87 | 39 | 50 | 489 | 102 | Comparative example |
| 24 | <u>Q</u> | 1250 | 1040 | 864 | 880 | 2.3 | 29 | 87 | 15 | 35 | 424 | 103 | Comparative example |
| 25 | R | 1250 | 1040 | 930 | 940 | 2.1 | 32 | 73 | 18 | 40 | 463 | 200 | Example of present invention |
| 26 | <u>S</u> | 1250 | 1040 | 846 | 871 | 2.3 | 33 | 88 | <u>5</u> | 35 | 413 | 110 | Comparative example |
| 27 | T | 1250 | 1040 | 878 | 891 | 2.3 | 40 | 96 | 26 | 40 | 452 | 103 | Example of present invention |
| 28 | <u>XA</u> | 1250 | 1040 | 936 | 960 | 2.1 | 32 | 84 | 17 | 40 | 463 | 130 | Comparative example |
| 29 | <u>XB</u> | 1250 | 1090 | 886 | 911 | 2.1 | 32 | 88 | <u>93</u> | <u>60</u> | 473 | 105 | Comparative example |
| 30 | <u>XC</u> | 1250 | 1040 | 885 | 898 | 2.3 | 40 | 96 | 26 | 40 | 452 | 102 | Comparative example |
| 31 | XD | 1250 | 1070 | 878 | 902 | 2.1 | 32 | 89 | 23 | 33 | 455 | 104 | Example of present invention |
| 32 | XE | 1250 | 1060 | 882 | 903 | 2.2 | 25 | 86 | 10 | <u>19</u> | 455 | 102 | Comparative example |
| 33 | XF | 1250 | 1070 | 879 | 890 | 2.0 | 20 | 78 | 10 | 50 | 448 | 120 | Comparative example |
| 34 | XG | 1250 | 1090 | 855 | 885 | 2.1 | 40 | 88 | 10 | 20 | 426 | 107 | Example of present invention |
| 35 | XH | 1250 | 1080 | 864 | <u>887</u> | <u>1.9</u> | 20 | 78 | 10 | 25 | 442 | 122 | Comparative example |
| 36 | <u>XI</u> | 1250 | 1080 | 847 | 860 | 2.1 | 21 | 85 | 38 | <u>40</u> | 419 | 130 | Comparative example |
| 37 | <u>XJ</u> | 1250 | 1070 | 836 | 855 | 2.1 | <u>23</u> | 85 | 33 | 45 | 412 | 120 | Comparative example |
| 38 | <u>XK</u> | 1250 | 1070 | 892 | 902 | 2.1 | 23 | 85 | 25 | 40 | 459 | 120 | Comparative example |
| 39 | <u>XL</u> | 1250 | 1080 | 930 | 930 | <u>1.0</u> | 20 | 87 | 12 | 40 | 453 | <u>350</u> | Comparative example |

Symbols and values outside of the preferred range are underlined.

TABLE 3A

| | | Location at 1/4 sheet thickness | | | | Location of 200 μm from surface | | Location of 100 μm from surface | | | | | |
|---|---|---|---|---|---|---|---|---|---|---|---|---|---|
| No. | Type of steel | M + TM area % | F + B + P area % | Average aspect ratio of prior γ grains | Average grain size of prior γ grains μm | M + TM area % | F + B + P area % | M + TM area % | F + B + P area % | Tensile strength MPa | Total elongation % | R/t | Remarks |
| 1 | A | 100 | 0 | 2.3 | 32 | 75 | 25 | 72 | 28 | 1010 | 9.8 | 1.0 | Example of present invention |
| 2 | B | 100 | 0 | 2.3 | 30 | 77 | 23 | 73 | 27 | 984 | 11.1 | 0.9 | Example of present invention |
| 3 | C | 100 | 0 | 2.7 | 19 | 76 | 24 | 73 | 27 | 1288 | 8.9 | 1.0 | Example of present invention |

TABLE 3A-continued

| | | Location at 1/4 sheet thickness | | | | Location of 200 μm from surface | | Location of 100 μm from surface | | | | | |
|---|---|---|---|---|---|---|---|---|---|---|---|---|---|
| No. | Type of steel | M + TM area % | F + B + P area % | Average aspect ratio of prior γ grains | Average grain size of prior γ grains μm | M + TM area % | F + B + P area % | M + TM area % | F + B + P area % | Tensile strength MPa | Total elongation % | R/t — | Remarks |
| 4 | D | 100 | 0 | 2.4 | 30 | 75 | 25 | 72 | 28 | 1033 | 9.7 | 0.9 | Example of present invention |
| 5 | E | 100 | 0 | 2.4 | 35 | 76 | 24 | 72 | 28 | 1116 | 9.7 | 1.0 | Example of present invention |
| 6 | F | 100 | 0 | 2.1 | 32 | 70 | 30 | 64 | 36 | 1152 | 9.3 | 1.0 | Example of present invention |
| 7 | G | 100 | 0 | 2.3 | 26 | 80 | 20 | 77 | 23 | 1152 | 9.4 | 1.0 | Example of present invention |
| 8 | H | 100 | 0 | 2.9 | 11 | 75 | 25 | 71 | 29 | 1288 | 8.8 | 1.0 | Example of present invention |
| 9 | I | 100 | 0 | 2.4 | 31 | 70 | 30 | 66 | 34 | 1075 | 9.7 | 0.9 | Example of present invention |
| 10 | J | 100 | 0 | 2.9 | 13 | 76 | 24 | 71 | 29 | 1265 | 8.7 | 1.0 | Example of present invention |
| 11 | K | 100 | 0 | 2.9 | 21 | 70 | 30 | 66 | 34 | 1081 | 9.5 | 1.0 | Example of present invention |
| 12 | L | 100 | 0 | 2.3 | 35 | 80 | 20 | 76 | 24 | 1091 | 9.6 | 1.0 | Example of present invention |
| 13 | M | 100 | 0 | 2.4 | 27 | 80 | 20 | 74 | 26 | 1079 | 9.4 | 0.9 | Example of present invention |
| 14 | N | 100 | 0 | 1.5 | 23 | 100 | 0 | 96 | 4 | 1152 | 9.1 | 1.8 | Comparative example |
| 15 | O | 60 | 40 | 1.5 | 27 | 50 | 50 | 45 | 55 | 950 | 10.1 | 1.7 | Comparative example |
| 16 | A | 100 | 0 | 2.8 | 19 | 60 | 40 | 56 | 44 | 968 | 10.1 | 1.3 | Comparative example |
| 17 | A | 100 | 0 | 1.9 | 60 | 98 | 2 | 95 | 5 | 1061 | 9.6 | 1.8 | Comparative example |
| 18 | A | 100 | 0 | 2.2 | 27 | 92 | 8 | 86 | 14 | 1055 | 9.5 | 1.8 | Comparative example |
| 19 | A | 100 | 0 | 2.1 | 27 | 94 | 6 | 89 | 11 | 1059 | 9.6 | 1.8 | Comparative example |

Symbols and values outside of the range of the present invention are underlined and symbols and values in which property values are not preferred are underlined.

TABLE 3B

| | | Location at 1/4 sheet thickness | | | | Location of 200 μm from surface | | Location of 100 μm from surface | | | | | |
|---|---|---|---|---|---|---|---|---|---|---|---|---|---|
| No. | Type of steel | M + TM area % | F + B + P area | Average aspect ratio of prior γ grains | Average grain size of prior γ grains μm | M + TM area % | F + B + P area % | M + TM area % | F + B + P area % | Tensile strength MPa | Total elongation % | R/t — | Remarks |
| 20 | A | 100 | 0 | 3.4 | 28 | 65 | 35 | 6.2 | 38 | 965 | 10.1 | 1.2 | Comparative example |
| 21 | A | 100 | 0 | 2.2 | 3 | 95 | 5 | 89 | 11 | 1021 | 9.8 | 1.8 | Comparative example |
| 22 | A | 11 | 89 | 2.1 | 32 | 9 | 91 | 6 | 94 | 681 | 13.0 | 1.2 | Comparative example |

TABLE 3B-continued

| | | | | | Location at 1/4 sheet thickness | | | | | | | |
| | | | | | Average aspect ratio of prior γ grains | Average grain size of prior γ grains μm | Location of 200 μm from surface | | Location of 100 μm from surface | | | | | |
| No. | Type of steel | M + TM area % | F + B + P area | | | | M + TM area % | F + B + P area % | M + TM area % | F + B + P area % | Tensile strength MPa | Total elongation % | R/t | Remarks |
|---|---|---|---|---|---|---|---|---|---|---|---|---|---|---|
| 23 | P | 100 | 0 | 2.3 | 43 | 74 | 26 | 70 | 30 | 935 | 11.3 | 1.0 | Comparative example |
| 24 | Q | 100 | 0 | 3.1 | 19 | 85 | 15 | 82 | 18 | 1491 | 8.7 | 2.4 | Comparative example |
| 25 | R | 100 | 0 | 2.3 | 49 | 76 | 24 | 71 | 29 | 1093 | 9.8 | 1.2 | Example of present invention |
| 26 | S | 100 | 0 | 2.3 | 15 | 100 | 0 | 100 | 0 | 1311 | 8.8 | 1.8 | Comparative example |
| 27 | T | 100 | 0 | 4.9 | 23 | 85 | 15 | 78 | 22 | 1171 | 9.1 | 1.3 | Example of present invention |
| 28 | XA | 77 | 23 | — | — | 74 | 26 | 67 | 33 | 870 | 12.0 | 1.0 | Comparative example |
| 29 | XB | 13 | 87 | — | — | 13 | 87 | 13 | 87 | 743 | 17.0 | 1.0 | Comparative example |
| 30 | XC | 100 | 0 | 5.6 | 24 | 85 | 15 | 78 | 22 | 1171 | 9.1 | 1.8 | Comparative example |
| 31 | XD | 90 | 10 | — | — | 75 | 25 | 73 | 27 | 1021 | 11.2 | 1.5 | Example of present invention |
| 32 | XE | 89 | 11 | — | — | 85 | 15 | 83 | 17 | 976 | 10.9 | 1.6 | Comparative example |
| 33 | XF | 100 | 0 | 3.6 | 33 | 91 | 9 | 82 | 18 | 1043 | 9.9 | 1.8 | Comparative example |
| 34 | XG | 100 | 0 | 4.5 | 48 | 83 | 17 | 78 | 22 | 1191 | 8.7 | 1.5 | Example of present invention |
| 35 | XH | 100 | 0 | 3.3 | 38 | 92 | 8 | 91 | 9 | 1112 | 8.8 | 1.8 | Comparative example |
| 36 | XI | 100 | 0 | 7.1 | 45 | 98 | 2 | 97 | 3 | 1230 | 8.7 | 2.0 | Comparative example |
| 37 | XJ | 100 | 0 | 8.5 | 16 | 98 | 2 | 97 | 3 | 1271 | 8.6 | 2.0 | Comparative example |
| 38 | XK | 100 | 0 | 9.1 | 16 | 100 | 0 | 100 | 0 | 1121 | 9.1 | 1.8 | Comparative example |
| 39 | XL | 100 | 0 | — | — | 100 | 0 | 100 | 0 | 1192 | 8.9 | 2.1 | Comparative example |

Symbols and values outside of the range of the present invention are underlined and symbols and values in which property values are not preferred are underlined.

Looking at Tables 3A and 3B, it can be seen that the hot-rolled steel sheets according to the examples of the present invention have high strength and excellent bendability.

On the other hand, it can be seen that the hot-rolled steel sheets according to the comparative examples are inferior in at least one of the above properties.

INDUSTRIAL APPLICABILITY

According to the above aspect of the present invention, a hot-rolled steel sheet having high strength and excellent bendability can be provided.

The invention claimed is:
1. A hot-rolled steel sheet having a chemical composition which contains, in % by mass,
C: 0.050 to 0.150%,
Si: 0.01 to 1.00%,
Mn: 1.00 to 2.50%,
P: 0.100% or less,
S: 0.020% or less,
N: 0.0050% or less,
Al: 0.001 to 0.300%,
Ti: 0.001 to 0.100%,
B: 0.0005 to 0.0050%,
Nb: 0 to 0.100%,
Cr: 0 to 1.00%,
V: 0 to 0.30%,
Cu: 0 to 0.30%,
Ni: 0 to 0.30%, and
Ca: 0 to 0.0050%,
wherein the remainder comprises Fe and impurities,
Vc represented by the following Expressions (1) to (3) is 10 to 40,
a microstructure contains, in area ratio,
at a location at ¼ a sheet thickness,
a total amount of 90% or more of one or more of martensite and tempered martensite and
a total amount of 10% or less of one or more ferrite, bainite, and pearlite,
at a location of 200 μm from a surface,
a total amount of 70% or more and less than 90% of one or more of martensite and tempered martensite and
a total amount of more than 10% and 30% or less of one or more of ferrite, bainite, and pearlite:

when an effective amount of B≥0.0005% by mass is satisfied, $$V_C = 10^{2.94-0.75\times(2.7\times C+0.4\times Si+Mn+0.45\times Ni+0.8\times Cr)}$$

when an effective amount of B<0.0005% by mass is satisfied, $$V_C = 10^{3.69-0.75\times(2.7\times C+0.4\times Si+Mn+0.45\times Ni+0.8\times Cr)} \quad (1),$$

an effective amount of B=10.81×(B/10.81−solid solution N amount/14.01)     (2), and solid solution N amount=14.01×(N/14.01−Ti/47.88)     (3), here, each element symbol in the above Expression (1) is the content of the element in % by mass, and when the element is not contained, 0 is substituted, B in the above Expression (2) is, in % by mass, a B content, when the effective amount of B is a negative value, the effective amount of B is set to 0, N and Ti in the above Expression (3) are, in % by mass, contents, and when the solid solution N amount is a negative value, the solid solution N amount is 0.

2. A hot-rolled steel sheet having a chemical composition which contains, in % by mass,
C: 0.050 to 0.150%,
Si: 0.01 to 1.00%,
Mn: 1.00 to 2.50%,
P: 0.100% or less,
S: 0.020% or less,
N: 0.0050% or less,
Al: 0.001 to 0.300%,
Ti: 0.001 to 0.100%,
B: 0.0005 to 0.0050%,
Nb: 0 to 0.100%,
Cr: 0 to 1.00%,
V: 0 to 0.30%,
Cu: 0 to 0.30%,
Ni: 0 to 0.30%, and
Ca: 0 to 0.0050%,
wherein the remainder is composed of Fe and impurities,
Vc represented by the following Expressions (1) to (3) is 10 to 40,
a microstructure contains, in area ratio,
at a location at ¼ a sheet thickness,
a total amount of 90% or more of one or more of martensite and tempered martensite and
a total amount of 10% or less of one or more ferrite, bainite, and pearlite,
at a location of 200 μm from a surface,
a total amount of 70% or more and less than 90% of one or more of martensite and tempered martensite and
a total amount of more than 10% and 30% or less of one or more of ferrite, bainite, and pearlite:

when an effective amount of B≥0.0005% by mass is satisfied, $$V_C = 10^{2.94-0.75\times(2.7\times C+0.4\times Si+Mn+0.45\times Ni+0.8\times Cr)}$$

when an effective amount of B<0.0005% by mass is satisfied, $$V_C = 10^{3.69-0.75\times(2.7\times C+0.4\times Si+Mn+0.45\times Ni+0.8\times Cr)} \quad (1),$$

an effective amount of B=10.81×(B/10.81−solid solution N amount/14.01)     (2), and solid solution N amount=14.01×(N/14.01−Ti/47.88)     (3), here, each element symbol in the above Expression (1) is the content of the element in % by mass, and when the element is not contained, 0 is substituted, B in the above Expression (2) is, in % by mass, a B content, when the effective amount of B is a negative value, the effective amount of B is set to 0, N and Ti in the above Expression (3) are, in % by mass, contents, and when the solid solution N amount is a negative value, the solid solution N amount is 0.

3. The hot-rolled steel sheet according to claim 2 having the chemical composition which contains, in % by mass, one or more of
Nb: 0.005 to 0.100%,
Cr: 0.005 to 1.00%,
V: 0.005 to 0.30%,
Cu: 0.005 to 0.30%,
Ni: 0.005 to 0.30%, and
Ca: 0.0010 to 0.0050%.

4. The hot-rolled steel sheet according to claim 3, wherein the microstructure has, at the location at ¼ a sheet thickness, an average aspect ratio of prior austenite grains of 1.0 to 3.0.

5. The hot-rolled steel sheet according to claim 4, wherein the microstructure has, at the location at ¼ a sheet thickness, an average grain size of prior austenite grains of 5 to 40 μm.

6. The hot-rolled steel sheet according to claim 3, wherein the microstructure has, at the location at ¼ a sheet thickness, an average grain size of prior austenite grains of 5 to 40 μm.

7. The hot-rolled steel sheet according to claim 2, wherein the microstructure has, at the location at ¼ a sheet thickness, an average aspect ratio of prior austenite grains of 1.0 to 3.0.

8. The hot-rolled steel sheet according to claim 7, wherein the microstructure has, at the location at ¼ a sheet thickness, an average grain size of prior austenite grains of 5 to 40 μm.

9. The hot-rolled steel sheet according to claim 2, wherein the microstructure has, at the location at ¼ a sheet thickness, an average grain size of prior austenite grains of 5 to 40 μm.

* * * * *